(12) United States Patent
Kimura et al.

(10) Patent No.: US 9,528,621 B2
(45) Date of Patent: Dec. 27, 2016

(54) APPARATUS FOR SHUTTING OFF FLOW OF WATER THROUGH DUCTWORK

(71) Applicant: HITACHI ZOSEN CORPORATION, Osaka-shi, Osaka (JP)

(72) Inventors: Yuuichiro Kimura, Osaka (JP); Toshiaki Morii, Osaka (JP); Toru Itagaki, Osaka (JP); Kyouichi Nakayasu, Osaka (JP)

(73) Assignee: HITACHI ZOSEN CORPORATION, Osaka-Shi, Osaka (JP)

( * ) Notice: Subject to any disclaimer, the term of this patent is extended or adjusted under 35 U.S.C. 154(b) by 14 days.

(21) Appl. No.: 14/677,975

(22) Filed: Apr. 3, 2015

(65) Prior Publication Data

US 2015/0330526 A1    Nov. 19, 2015

(30) Foreign Application Priority Data

May 16, 2014  (JP) ................. 2014-102628

(51) Int. Cl.
*F16K 17/36*  (2006.01)
*F16K 31/46*  (2006.01)
*E06B 9/00*   (2006.01)

(52) U.S. Cl.
CPC .......... *F16K 17/363* (2013.01); *F16K 31/465* (2013.01); *E06B 2009/005* (2013.01); *E06B 2009/007* (2013.01); *Y10T 137/2036* (2015.04)

(58) Field of Classification Search
CPC ................. F16K 17/363; F16K 31/465; Y10T 137/2036; E06B 5/003; E06B 2009/007; E06B 9/04; E02B 7/50; E05B 11/04; E05F 1/00
See application file for complete search history.

(56) References Cited

U.S. PATENT DOCUMENTS 5,944,445 A *  8/1999  Montgomery ........ E04B 1/7076
                                                  405/87
6,623,209 B1 *  9/2003  Waters, Jr. .............. E02B 3/104
                                                  405/100
6,692,187 B2 *  2/2004  Sprengle, Sr. ............ E02B 7/40
                                                  405/92
(Continued)

FOREIGN PATENT DOCUMENTS

JP           2004-019966 A       1/2004

*Primary Examiner* — Craig Schneider
*Assistant Examiner* — Kevin Barss
(74) *Attorney, Agent, or Firm* — Yokoi & Co., U.S.A.; Toshiyuki Yokoi

(57) ABSTRACT

An apparatus for shutting off the flow of water through ductwork is disclosed that is installed in an air conditioning duct in a building and closes the air conditioning duct in the event of the attack of seawater. Two upper and lower hinged door bodies disposed in the inside of the air conditioning duct are supported by a support device in the state in which the inside of the air conditioning duct is open. The opening and closing operations of the upper door body are interlocked with the opening and closing operations of the lower door body by a chain. A water intrusion detection device releases the supporting of the two upper and lower door bodies in the event of the intrusion of water. The two upper and lower door bodies are horizontally moved in the direction of water pressure when the inside of the air conditioning duct is closed.

6 Claims, 5 Drawing Sheets

(56) References Cited

U.S. PATENT DOCUMENTS

| | | | | |
|---|---|---|---|---|
| 7,131,244 B1* | 11/2006 | Bradwell | ............... | E06B 5/003 160/371 |
| 8,308,396 B2* | 11/2012 | Shook | ................... | E04B 1/7076 405/100 |
| 8,366,348 B2* | 2/2013 | Morii | ...................... | E02B 7/52 210/170.1 |
| 8,511,939 B2* | 8/2013 | Waters, Jr. | ............... | E02B 7/50 405/112 |
| 9,011,042 B2* | 4/2015 | Nakayasu | ............... | E02B 3/102 405/100 |
| 9,267,322 B2* | 2/2016 | Inui | ........................ | E06B 5/003 |
| 2012/0028564 A1* | 2/2012 | Kelly | ................... | E04B 1/7076 454/275 |
| 2012/0034032 A1* | 2/2012 | Waters, Jr. | ............. | E02B 3/104 405/92 |
| 2013/0314254 A1* | 11/2013 | Neff | ........................ | E01F 13/06 340/907 |
| 2014/0193202 A1* | 7/2014 | Arai | ......................... | E02B 7/40 405/100 |

\* cited by examiner

APPARATUS FOR SHUTTING OFF FLOW OF WATER THROUGH DUCTWORK

CROSS-REFERENCES TO RELATED APPLICATIONS

This patent specification is based on Japanese patent application, No. 2014-102628 filed on May 16, 2014 in the Japan Patent Office, the entire contents of which are incorporated by reference herein.

BACKGROUND OF THE INVENTION

1. Field of the Invention

The present invention relates to an apparatus for shutting off the flow of water through ductwork that closes air conditioning ductwork installed in a fixed structure, for example, when sea waves attack, thereby preventing seawater from intruding into a room.

2. Description of the Related Art

An air conditioning apparatus is disclosed that, in order to condition the air of each room in a fixed structure (hereinafter referred to as the "building"), supplies external air, received from an external air inlet, to the room through an inflow duct and discharges air, discharged from the room, to an outlet through an exhaust duct (see, e.g., Japanese Unexamined Patent Application Publication No. 2004-19966).

In the case where the building equipped with the air conditioning apparatus is strong because it has a reinforced concrete structure or the like, even when the building is not swept away by sea waves in the event of the attack of the sea waves, seawater intrudes from the external air inlet or outlet, installed in the building, into the room via the inflow duct or exhaust duct, thus resulting in significant damage.

BRIEF SUMMARY OF THE INVENTION

A problem that the present invention attempts to solve resides in that seawater intrudes into a room via an inflow duct or an exhaust duct even when a building is not swept away by sea waves because the building is strong in the event of an attack of seawater, thus resulting in significant damage.

In order to overcome the above-described problem, an object of the present invention is to close an air conditioning duct, such as an inflow duct or an exhaust duct, when sea waves attack, thereby preventing seawater from intruding into a room.

According to the present invention, there is provided an apparatus for shutting off flow of water through ductwork, the apparatus being installed in an air conditioning duct installed in a building and closing the air conditioning duct when sea waves attack, the apparatus including:

two upper and lower hinged door bodies disposed in an inside of the air conditioning duct;

a support device configured to support the two upper and lower door bodies in a state in which the inside of the air conditioning duct is open;

a chain or a belt configured to interlock opening and closing operations of the upper door body with opening and closing operations of the lower door body; and a water intrusion detection device configured to detect intrusion of water into the air conditioning duct and release the supporting of the two upper and lower door bodies in the open state when the intrusion of water is detected;

wherein the two upper and lower door bodies are configured to be horizontally moved in a direction in which pressure of water, attributable to the intrusion of water into the air conditioning duct, is applied when the inside of the air conditioning duct is closed.

In the present invention, when seawater intrudes into the inside of the air conditioning duct due to the attack of sea waves, the water intrusion detection device detects the intrusion of the seawater and releases the supporting of the two upper and lower door bodies by the support device. The two upper and lower door bodies whose supporting has been released are closed in an interlocked manner, and thus close the inside of the air conditioning duct. The two upper and lower closed door bodies are horizontally moved by water pressure in a direction in which the water pressure is applied, and are thus pressed against airtight rubber.

In the present invention, an operation in which the two upper and lower door bodies are closed is performed using the weight of the upper door body, a counterweight mounted on the axis of rotation of the upper or lower door body, a motor, or a combination thereof.

In the present invention, when a damper is attached to a moving part of the upper or lower door body, impact when the door bodies are closed can be suppressed.

In the present invention, when the chain or belt configured to interlock the opening and closing operations of the upper door body with the opening and closing operations of the lower door body is configured to be driven by a motor, it is preferable to employ a brake configured to suppress the motor as the support device.

BRIEF DESCRIPTION OF THE DRAWINGS

The above and other objects, features and advantages of the present invention will be more clearly understood from the following detailed description taken in conjunction with the accompanying drawings, in which:

FIGS. 2A and 2B show diagrams illustrating the movement of door bodies when the pressure of water is applied to the apparatus for shutting off the flow of water through ductwork according to the present invention, wherein FIG. 2A illustrates the movement of the upper door body and FIG. 2B illustrates the movement of the lower door body;

FIGS. 3A and 3B show diagrams illustrating an example an chain mechanism for interlocking the opening and closing operations of an upper door body with the opening and closing operations of a lower door body and a support device for supporting the two upper and lower door bodies in an open state are installed, wherein FIG. 3A illustrates the open state of two upper and lower door bodies and FIG. 3B illustrates the closed state of the two upper and lower door bodies;

FIGS. 4A and 4B show diagrams illustrating other examples of the driving of the door bodies in the apparatus for shutting off the flow of water through ductwork according to the present invention, wherein FIG. 4A illustrates a case where a counterweight mounted on the horizontal shaft of the lower door body aids in the driving of the door bodies and FIG. 4B illustrates a case where the door bodies are driven by a motor;

FIGS. 5A and 5B show diagrams illustrating cases where a support device for supporting two upper and lower door bodies in an open state is installed outside an air conditioning duct, wherein FIG. 5A illustrates a case where a counterweight for driving the lower door body is supported and FIG. 5B illustrates a case where a counterweight for driving the upper door body is supported;

FIGS. 6A and 6B show diagrams illustrating examples of a mechanism for adjusting the tension of a chain that interlocks the opening and closing operations of an upper door body with the opening and closing operations of a lower door body, wherein FIG. 6A illustrates a case where the tension of the chain is adjusted by turnbuckles and FIG. 6B illustrates a case where the tension of the chain is adjusted by tensioners; and FIGS. 7A and 7B show shows diagrams illustrating an example of a mechanism for suppressing impact when two upper and lower door bodies are closed, wherein FIG. 7A illustrates a state in which the door bodies are open and FIG. 7B illustrates a state in which the door bodies are closed.

DETAILED DESCRIPTION OF THE INVENTION

The present invention has the object of closing air conditioning ductwork in response to the intrusion of water attributable to the attack of sea waves, thereby preventing seawater from intruding into a room in a building. The object of the present invention is achieved by detecting the intrusion of seawater into the air conditioning ductwork, closing two upper and lower door bodies, whose supporting has been released, in an interlocked manner, to thereby close the inside of the air conditioning ductwork, and horizontally moving the closed door bodies in a direction, in which water pressure is applied, to thereby press the door bodies against airtight rubber.

Embodiments

Hereinafter, embodiments for carrying out the present invention are described in detail with reference to FIGS. 1 to 7B.

Figure 1:
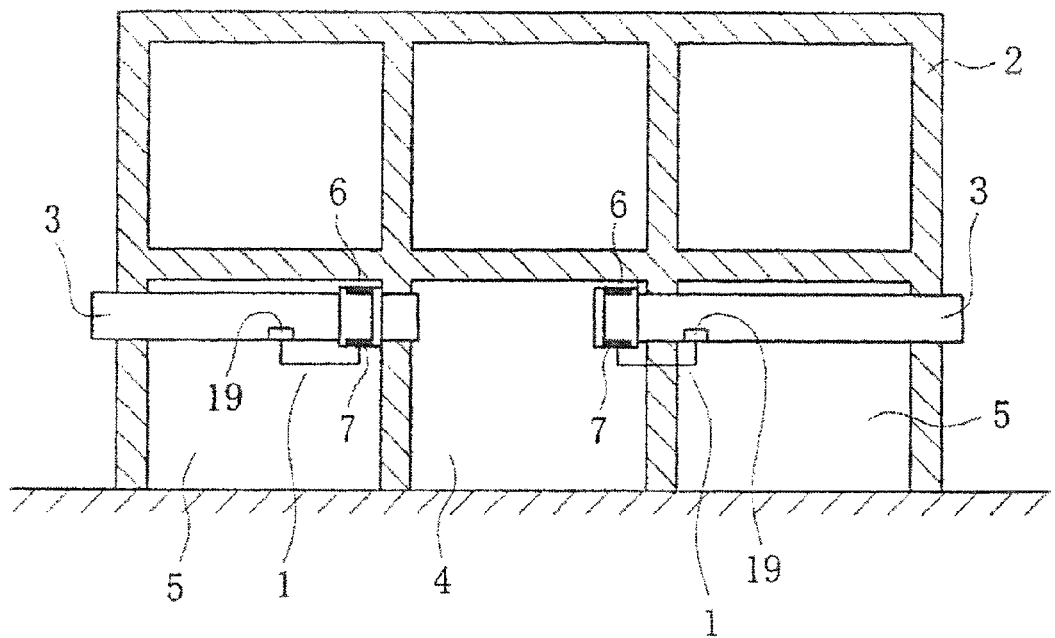
FIG. 1 is a diagram illustrating an example of the location of installation of an apparatus for shutting off the flow of water through ductwork according to the present invention.
Figure 2A:
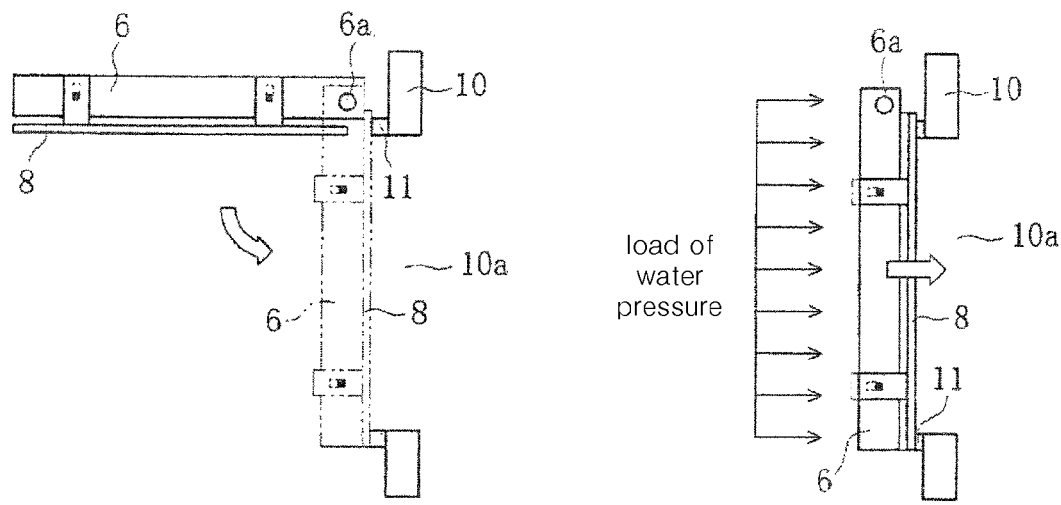
Figure 2B:
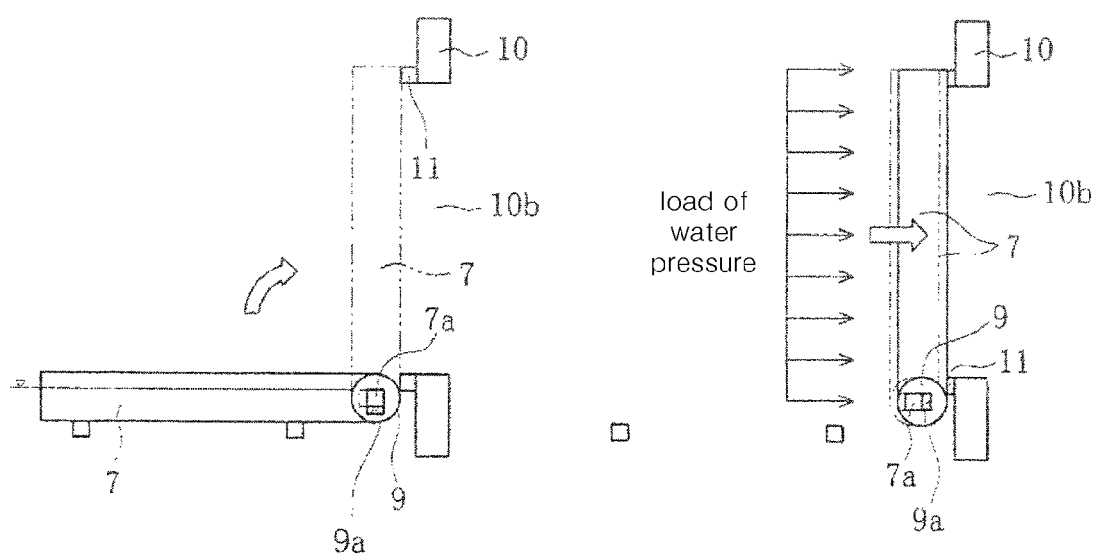
Figure 3A:
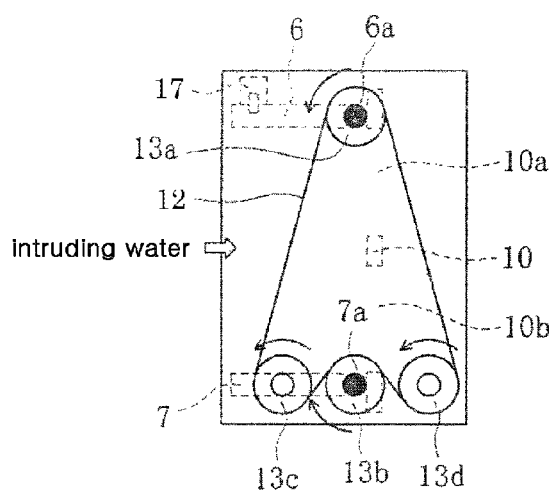
Figure 3B:
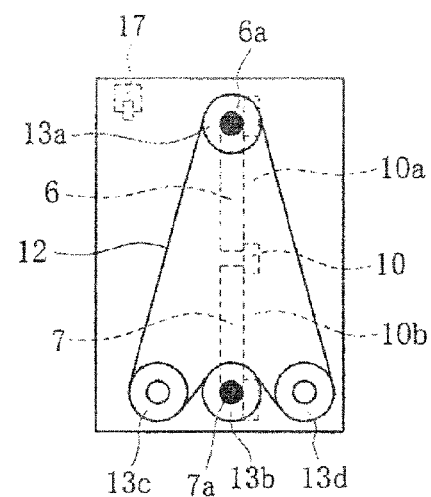

FIGS. 1 to 3B are diagrams illustrating a first example of an apparatus for shutting off the flow of water through ductwork according to the present invention, wherein FIG. 1 illustrates the location of installation of the apparatus for shutting off the flow of water through ductwork, FIGS. 2A and 2B illustrate the movement of door bodies when the pressure of water is applied, and FIGS. 3A and 3B illustrate an example an chain mechanism for interlocking the opening and closing operations of an upper door body with the opening and closing operations of a lower door body and a support device for supporting the two upper and lower door bodies in an open state are installed.

The apparatus 1 for shutting off the flow of water through ductwork according to the present invention is installed in an air conditioning duct 3 in order to prevent seawater from intruding from an external air inlet, formed in a building 2, into an important machine room 4 through the air conditioning duct 3 even when a building 2 is not swept away by sea waves in the event of the attack of sea waves.

The location of installation of the apparatus 1 for shutting off the flow of water through ductwork according to the present invention is not limited as long as the apparatus 1 for shutting off the flow of water through ductwork is installed in the air conditioning duct 3 so that it can prevent seawater from intruding into the important machine room 4. For example, in an example illustrated on the left side of FIG. 1, the apparatus 1 for shutting off the flow of water through ductwork is installed at a location near the surface of a wall of the important machine room 4 inside a general room 5 adjacent to the important machine room 4. Furthermore, in an example illustrated on the right side of FIG. 1, the apparatus 1 for shutting off the flow of water through ductwork is installed at the end of the air conditioning duct 3 that protrudes into the important machine room 4.

Reference numeral 6 denotes an upper door body disposed on the upper side of the inside of the air conditioning duct 3. The upper door body 6 is supported inside the air conditioning duct 3 so that the upper door body 6 can be rotated from a horizontal state to a downwardly vertical state using a horizontal shaft 6a, protruding from both sides of the upper end of the inside of the air conditioning duct 3, as a support point.

Reference numeral 7 denotes a lower door body disposed on the lower side of the inside of the air conditioning duct 3. The lower door body 7 is supported inside the air conditioning duct 3 so that the lower door body 7 can be rotated from a horizontal state to a raised state in an upwardly vertical direction using a horizontal shaft 7a, protruding from both sides of the lower end of the inside of the air conditioning duct 3, as a support point.

That is, these upper and lower door bodies 6 and 7 are configured to close the inside of the air conditioning duct 3 (in a hinged manner) (in a state indicated by imaginary lines on the left sides of FIGS. 2A and 2B) by being changed from a state in which the inside of the air conditioning duct 3 is open and the upper and lower door bodies 6 and 7 are horizontal (a state indicated by solid lines on the left sides of FIGS. 2A and 2B) to a state in which the upper door body 6 is lowered to a downwardly vertical state and the lower door body 7 is raised in an upwardly vertical direction.

Furthermore, the upper door body 6 and the lower door body 7 are configured such that they are horizontally moved in a direction in which the water pressure of seawater intruding into the inside of the air conditioning duct 3 is applied when the air conditioning duct 3 is closed (see the right sides of FIGS. 2A and 2B).

For example, in connection with the upper door body 6, a skin plate 8 is disposed under the upper door body 6 in an open state so that the skin plate 8 can approach or be separated from the upper door body 6. According to this configuration, when the upper door body 6 is closed and enters a downwardly vertical state, the skin plate 8 is horizontally moved by the water pressure of seawater, intruding into the inside of the air conditioning duct 3, in a direction in which the water pressure is applied.

Furthermore, in connection with the lower door body 7, a bearing portion 9 for the horizontal shaft 7a is formed in a longitudinal hole 9a that extends downwardly when the lower door body 7 is in an open state. According to this configuration, when the lower door body 7 enters a state in which the lower door body 7 has been raised in an upwardly vertical direction, the lower door body 7 is horizontally moved by the water pressure of seawater, intruding into the inside of the air conditioning duct 3, in a direction in which the water pressure is applied.

Reference numeral 10 denotes a door stopper that is disposed downstream of the upper and lower door bodies 6 and 7 at the location of the inside of the air conditioning duct 3 with which the skin plate 8 and the back surface of the lower door body 7 come into contact when the upper door body 6 enters a downwardly vertical state and the lower door body 7 is raised in an upwardly vertical direction, so that they close the inside of the air conditioning duct 3.

This door stopper 10 has ventilation openings 10a and 10b in the height direction above and below the center portion thereof, and is provided with airtight rubber 11 on the sides thereof with which the skin plate 8 and the back surface of the lower door body 7 come into contact.

Reference numeral 12 denotes, for example, a chain that interlocks the opening and closing operations of the upper door body 6 with the opening and closing operations of the lower door body 7. This chain 12 engages with sprockets located at shaft center locations corresponding to the horizontal shafts 6$a$ and 7$a$ of the upper and lower door bodies 6 and 7 and on the upstream and downstream sides of the horizontal shaft 7$a$ of the lower door body 7, respectively, i.e., a total of four sprockets 13$a$ to 13$d$, so that the operations of the upper and lower door bodies 6 and 7 from an open state (see FIG. 3A) to a closed state (see FIG. 3B) can be interlocked with each other. Furthermore, a mechanism for interlocking the opening and closing operations of the upper door body 6 with the opening and closing operations of the lower door body 7 is installed outside the air conditioning duct 3.

The interlocking that is performed when the upper and lower door bodies 6 and 7 are closed from an open state is performed via the chain 12 in such a way that when the upper door body 6 is rotated by its own weight by using the horizontal shaft 6$a$ as a support point, the sprocket 13$a$ installed at the shaft center location corresponding to the horizontal shaft 6$a$ is rotated.

An interlocking means that is employed when the upper and lower door bodies 6 and 7 are closed from an open state is not limited to a means in which the upper door body 6 is rotated by its own weight by using the horizontal shaft 6$a$ as a support point.

Figure 4A:
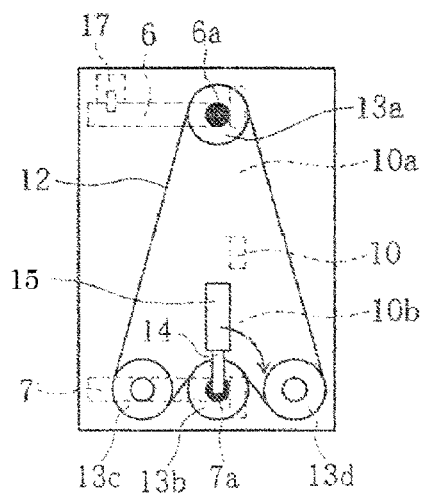

For example, as illustrated in FIG. 4A, a mean may be employed in which a torque arm 14 is attached to the horizontal shaft 7$a$ of the lower door body 7 in an open position in the state of being raised in an upwardly vertical direction and a counterweight 15 is mounted on the torque arm 14. In this case, the closing of the air conditioning duct 3 is more rapidly achieved because the counterweight 15 aids in the rotation of the sprocket 13$a$ attributable to the rotation of the upper door body 6.

Figure 4B:
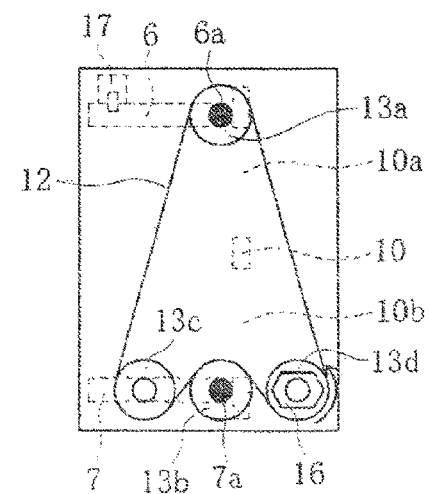

Furthermore, as illustrated in FIG. 4B, a means may be employed in which the sprocket 13$d$ installed downstream of the horizontal shaft 7$a$ of the lower door body 7 is rotated by a motor 16 in forward and reverse directions.

Reference numeral 17 denotes a support device that normally supports the upper and lower door bodies 6 and 7 in a state in which the inside of the air conditioning duct 3 is open.

The configuration of the support device 17 is not limited to a particular configuration, such as a configuration for magnetically supporting the upper and lower door bodies 6 and 7, as long as the support device 17 supports the upper and lower door bodies 6 and 7 in a state in which the inside of the air conditioning duct 3 is open. In this case, when maintenance and repair are taken into account, it is preferred that the support device 17 be installed outside the air conditioning duct 3.

Figure 5A:
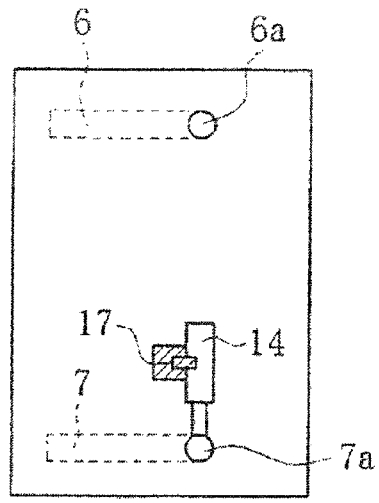

When the lower door body 7 is supported, the torque arm 14 also functioning as a weight that drives the lower door body 7 may be supported by the support device 17 installed outside the air conditioning duct 3, as illustrated in FIG. 5A.

Figure 5B:
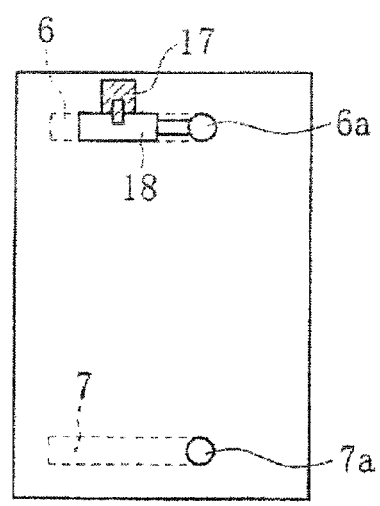

Alternatively, when the upper door body 6 is supported, a torque arm 18 also functioning as a weight that drives the upper door body 6 may be mounted on the horizontal shaft 6$a$ of the upper door body 6 in an open position in parallel with the upper door body 6 and then the torque arm 18 may be supported, as illustrated in FIG. 5B.

Furthermore, when interlocking that is performed in the case where the upper and lower door bodies 6 and 7 are closed from an open state is performed by the motor 16, a brake that suppresses the rotation of the motor 16 may be used as the support device 17.

Reference numeral 19 denotes a water intrusion detection device that is installed upstream of a location at which closing is performed by the door bodies 6 and 7 in the inside of the air conditioning duct 3 and detects the intrusion of water into the air conditioning duct 3. When the intrusion of water is detected, the supporting of the upper and lower door bodies 6 and 7 are released (see FIG. 1).

The water intrusion detection device 19 may be of one of a float type, an electric type (for example, an electric capacitance type), an electromagnetic type, and an ultrasonic type.

Of these types of devices, the float-type water intrusion detection device 19 is configured to transfer buoyancy attributable to the intrusion of water to the support device 17, thereby releasing the supporting of the support device 17. This float-type water intrusion detection device is employed in the case of a support device that performs mechanical supporting.

Furthermore, the electric capacitance-type water intrusion detection device 19 is configured to, when a change in electric capacitance attributable to the intrusion of water between electrodes is detected, send an electric signal to the support device 17 to electrically release the supporting of the support device 17.

Furthermore, the electromagnetic-type water intrusion detection device 19 is configured to, when a change in magnetic field attributable to the intrusion of water between electrodes is detected, send an electric signal to the support device 17 to electrically release the supporting of the support device 17.

Moreover, the ultrasonic-type water intrusion detection device 19 is configured to detect the presence of the intrusion of water by radiating ultrasonic waves that reflect from the surface of water and send an electric signal to the support device 17 to electrically release the supporting of the support device 17 when the intrusion of water is detected.

These electrical-type, electromagnetic-type and ultrasonic wave-type water intrusion detection devices 19 are employed in the case of the support device 17 that performs supporting by magnetic force. Furthermore, the support device 17 that performs supporting by magnetic force includes a brake that suppresses the rotation of a motor using magnetic force.

Figure 6A:
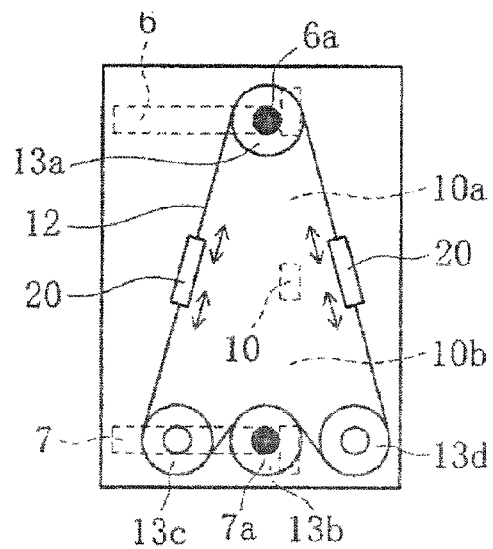
Figure 6B:
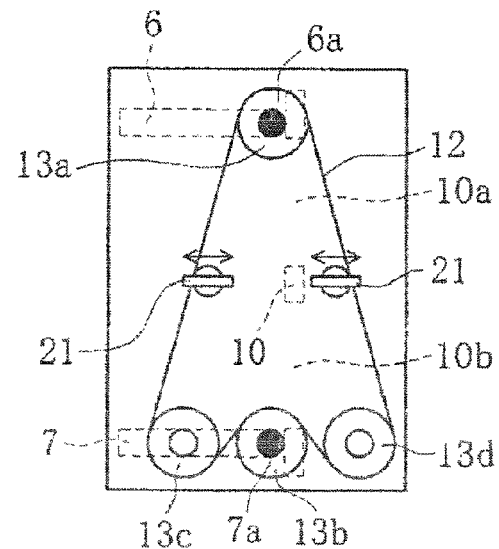

When the opening and closing operations of the upper door body 6 are interlocked with the opening and closing operations of the lower door body 7 by the chain 12, the tension of the chain 12 may be adjusted by inserting turnbuckles 20 in the middle of the chain 12, as illustrated in FIG. 6A. Alternatively, it may be possible to dispose tensioners 21, instead of the turnbuckles 20, in the middle of the chain 12 and then adjust the tension of the chain 12, as illustrated in FIG. 6B.

Figure 7A:
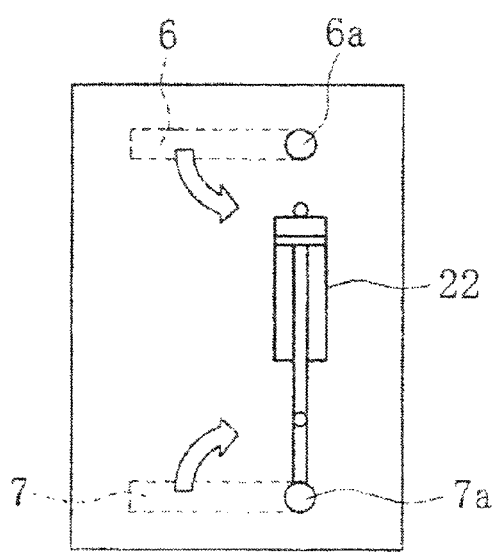
Figure 7B:
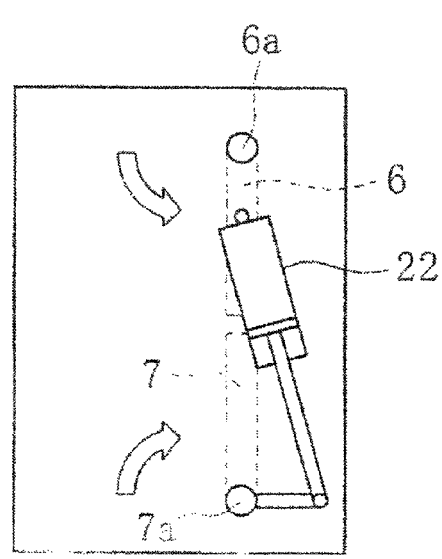

Furthermore, for example, when the front end of a damper 22 that rotatably supports a base end side is rotatably attached to the torque arm 14 attached to the horizontal shaft 7$a$ of the lower door body 7, as illustrated in FIGS. 7A and 7B, impact that occurs when the door bodies 6 and 7 are closed can be suppressed.

According to the apparatus 1 for shutting off the flow of water through ductwork according to the present invention, which is configured as described above, in normal times, fresh air flowing through the air conditioning duct 3 enters the important machine room 4, as illustrated on the left sides of FIGS. 2A and 2B. According to the above-described configuration, there is no case where, for example, even when the building 2 is vibrated, the door bodies 6 and 7 are closed by the action of the support device 17 and thus the inside of the air conditioning duct 3 is closed.

Meanwhile, when seawater intrudes into the inside of the air conditioning duct 3 in case of emergency, the apparatus 1 for shutting off the flow of water through ductwork detects the intrusion of seawater using the water intrusion detection device 19 illustrated in FIG. 1 and sends a signal adapted to release the supporting of the upper door body 6 to the support device 17. When the supporting of the upper door body 6 is released, the upper and lower door bodies 6 and 7 are closed in an interlocked manner and thus close the inside of the air conditioning duct 3, as illustrated in the right sides of FIGS. 2A and 2B.

The skin plate 8, connected with the upper door body 6 that has closed the inside of the air conditioning duct 3, and the lower door body 7 are pressed against the airtight rubber 11 by the water pressure of seawater that has intruded into the inside of the air conditioning duct 3.

The apparatus 1 for shutting off the flow of water through ductwork according to the present invention can apply effective measures to only important places essentially requiring the avoidance of the intrusion of water because the measures against the intrusion of water can be taken by replacing only part of the existing air conditioning duct 3.

Furthermore, the range of application of the apparatus 1 for shutting off the flow of water through ductwork according to the present invention is wide because the apparatus 1 for shutting off the flow of water through ductwork can be realized in small size and light weight.

The present invention is not limited to the above-described examples, but appropriate changes to the embodiments can be made within the scope of the technical spirit of each of the claims.

For example, although the example in which the apparatus 1 for shutting off the flow of water through ductwork according to the present invention is attached to the inflow duct in the embodiment, the apparatus 1 for shutting off the flow of water through ductwork according to the present invention may be attached to an exhaust duct.

Furthermore, although the example in which the damper 22 is attached to the lower door body 7 has been illustrated in the embodiment of FIGS. 7A and 7B, the damper 22 may be attached to the upper door body 6. Furthermore, although the example in which the opening and closing operations of the upper door body 6 and the opening and closing operations of the lower door body 7 are interlocked with each other by the chain 12, the interlocking may be performed using a belt. In this case, tension is adjusted using tensioners. Furthermore, it may be possible to suppress impact, occurring when the upper and lower door bodies 6 and 7 are closed, using an air cylinder instead of the damper 22.

Furthermore, as the water intrusion detection device 19, a volume may be imparted to the lower door body 7 itself, and the intrusion of water may be detected by the floating of the lower door body 7 resulting from buoyancy attributable to the intrusion of water. In this case, the floating force of the lower door body 7 is transferred by the torque arm 14 coaxial with the horizontal shaft 7a of the lower door body 7, and thus the supporting of the support device 17 is released by the moment of the torque arm 14.

According to the present invention, the two upper and lower door bodies whose closing has been released by the detection of seawater intruding into an air conditioning duct in the event of the attack of sea waves are closed in an interlocked manner and thus close the inside of the air conditioning duct, are horizontally moved in a direction in which the pressure of water is applied, and are pressed against the airtight rubber. Accordingly, watertightness when the inside of the air conditioning duct is closed is improved and thus seawater can be prevented from intruding into a room in a building, with the result that reliable measures can be taken against the intrusion of water into an important machine room.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

While the invention has been particularly shown and described with respect to preferred embodiments thereof, it should be understood by those skilled in the art that the foregoing and other changes in form and detail may be made therein without departing from the sprit and scope of the invention as defined in the appended claims.

What is claimed is:

1. An apparatus for shutting off the flow of water through ductwork, the apparatus being installed in an air conditioning duct that is installed in a fixed structure for use in a high floodwater condition that occurs at a time such as during a tsunami, the apparatus comprising:
   upper and lower hinged door bodies disposed in an inside of the air conditioning duct;
   a support device configured to normally hold the upper and lower door bodies in an open position which allows air to flow through the air conditioning duct;
   a chain or a belt configured to interconnect the opening and closing operations of the upper door body with the opening and closing operations of the lower door body; and
   a water intrusion detection device configured to detect the intrusion of water into the air conditioning duct which releases the support device allowing the upper and lower door bodies to move from an open position to a closed position;
   wherein the upper and lower door bodies are configured to be horizontally moved in a direction in which pressure of water, attributable to the intrusion of water into the air conditioning duct, is applied when the inside of the air conditioning duct is closed.

2. The apparatus of claim 1, wherein a volume is imparted to the lower door body and the intrusion of water is detected when the lower door body is floated on the water.

3. The apparatus of claim 1, wherein the water intrusion detection device is configured to detect a change in electric capacitance or magnetic field resulting from intrusion of water between electrodes or to detect the presence of water in the air conditioning duct through reflection of an ultrasonic wave radiated onto a surface of the intruding water; and the water intrusion detection device is configured to send an electric signal to the support device causing the support device to release to allow the upper and lower hinged doors to move from the open position to the closed position.

4. The apparatus of claim 1, wherein driving of the upper and lower door bodies from the open position to the closed position is performed after the support device has been released, by a counterweight mounted on a horizontal shaft of the upper or lower door body.

5. The apparatus of claim 1, wherein a damper is attached to the upper or lower door body.

6. The apparatus of claim 1, wherein:

the chain or belt configured to interconnect the opening and closing operations of the upper door body with the opening and closing operations of the lower door body is configured to be driven by a motor.

\* \* \* \* \*